Oct. 18, 1932.   W. H. WATROUS   1,883,154
COMBINATION JACK AND PRESSURE GAUGE
Filed April 18, 1928

INVENTOR.
Willis H. Watrous.
BY
Townsend, Loftus & Abbett
ATTORNEYS.

Patented Oct. 18, 1932

1,883,154

UNITED STATES PATENT OFFICE

WILLIS H. WATROUS, OF OAKLAND, CALIFORNIA

COMBINATION JACK AND PRESSURE GAUGE

Application filed April 18, 1928. Serial No. 271,076.

This invention relates to a combination jack and pressure gauge.

When adjusting and testing vehicle brakes, such as used on automobiles and the like, it is desirable to depress the foot brake pedal and to retain it in a depressed position while the brakes are being adjusted and tested. It is also desirable to apply a predetermined pressure to the pedal and the brakes actuated thereby, which is substantially equal to the average pressure exerted when the foot pedal is depressed by the foot of the operator so that the brakes may be adjusted in accordance therewith.

The object of the present invention is to provide a simple readily operated mechanism whereby the brake pedal of an automobile or the like may be depressed and the amount of pressure applied determined.

The invention, briefly stated, embodies an adjustable jack insertable between the front seat of the automobile and the foot brake pedal; a ratchet mechanism whereby the jack may be quickly extended and adjusted to depress the pedal to any degree desired; a gauge mechanism cooperating therewith to indicate the amount of pressure applied; and a releasing mechanism whereby the jack may be quickly retracted and removed when the adjusting and testing of the brakes is completed.

The invention is shown by way of illustration in the accompanying drawing, in which:

Figure 3 is an enlarged detail view of the ratchet mechanism whereby the jack is operated.

Figure 2:
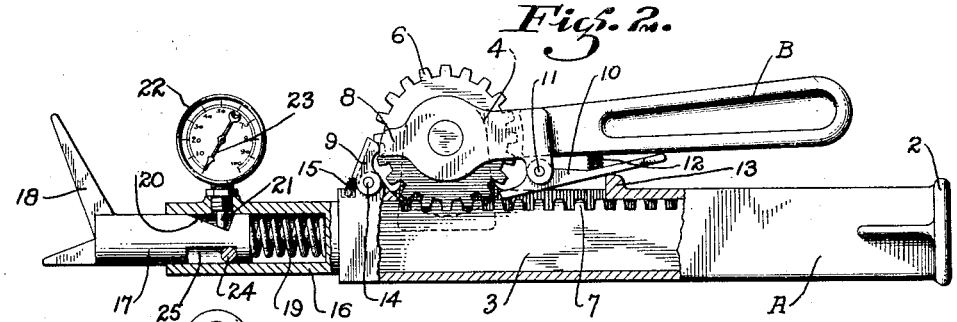
Figure 3:
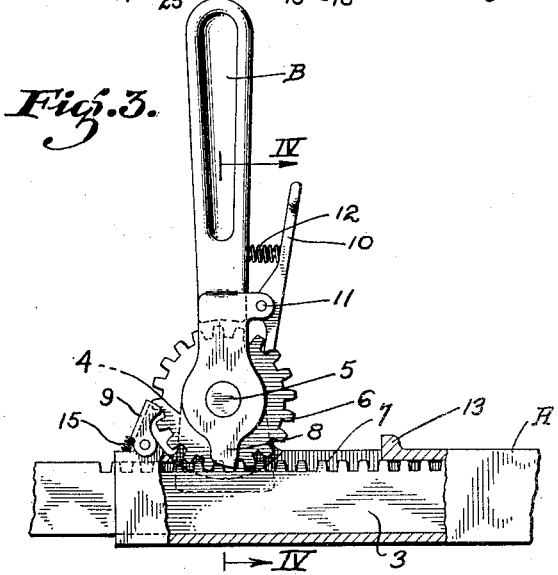
Figure 3 is an enlarged detail view of the jack and the pressure gauge, said view being partially in section and partly broken away.
Figure 4:
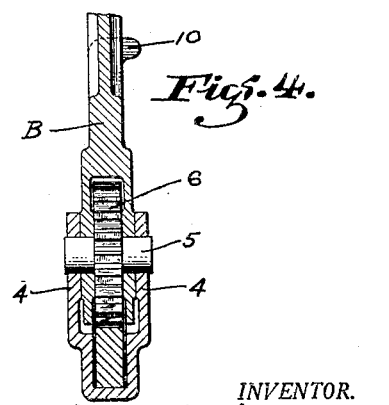
Figure 4 is a vertical cross-section taken on line IV—IV, Figure 3.

Referring to the drawing in detail and particularly Figures 2, 3 and 4, A indicates an elongated jack housing provided with a foot extension 2 on one end thereof. The opposite end is open and is adapted to telescopically receive a rack bar, such as indicated at 3. Forming an extension of the jack housing near the forward open end thereof is a pair of bearing lugs 4—4. Journaled in the bearing lugs is a pin or shaft 5 and journaled on the pin is a gear 6, of the spur gear type which meshes with teeth 7 formed on the rack bar. Also pivotally mounted on the shaft 5 is an operating lever generally indicated at B. This lever carries a pair of cams 8 which are engageable with a pawl 9 and it also carries a pawl 10 which is engageable with the teeth of the gear 6 when it is desired to rotate the same to advance or retract the rack bar 3. The pawl 10 is pivotally mounted at the point 11 and it is normally held in engagement with the teeth of the gear 6 by means of a spring 12. A lug 13 is formed on the jack housing, as shown, and this engages a lever extension on the pawl 10 when it is desired to throw the pawl out of engagement with the teeth of the gear 6, as will hereinafter be described. The pawl 9 is pivoted to the forward end of the jack housing as at 14 and it is normally held in engagement with the teeth of the gear 6 by means of a spring 15. It is, however, thrown out of engagement with the teeth when the lever B is depressed, as shown in Figure 2, as it is at that time engaged by the cam members 8.

Formed on the forward end of the rack bar 3 is a cylindrical extension 16 in which is mounted a plunger 17. The outer end of the plunger is provided with a foot extension 18 whereby the brake pedal indicated at C is adapted to be engaged. A spring 19 is interposed between the inner end of the plunger and the bottom of the cylindrical extension, and a cam face is formed in the upper face of the plunger, as indicated at 20. This face engages a pin 21 which is mounted in a measuring instrument, such as a gauge or the like indicated at 22. Any suitable gauge may be employed, for instance an ordinary pressure gauge which contains a Bourdon tube which is connected with an indicating hand 23 through means of a link and rack movement. The pin 21 actuates the Bourdon tube and this in turn actuates the link and rack movement and thereby causes the indicating hand 23 to move over the dial of the gauge and thereby indicate the amount of pressure exerted, i. e., the actual pressure exerted is taken up by the spring 19 but the gauge is adjusted so as to indicate the amount of pressure exerted thereon. The movement of the plunger is taken care of by a cross pin 24 which works in a notch or slot 25 formed in the lower side of the plunger. This is of more or less importance as it protects the pin 21 of the gauge against shearing movement and excess strains.

Figure 1:
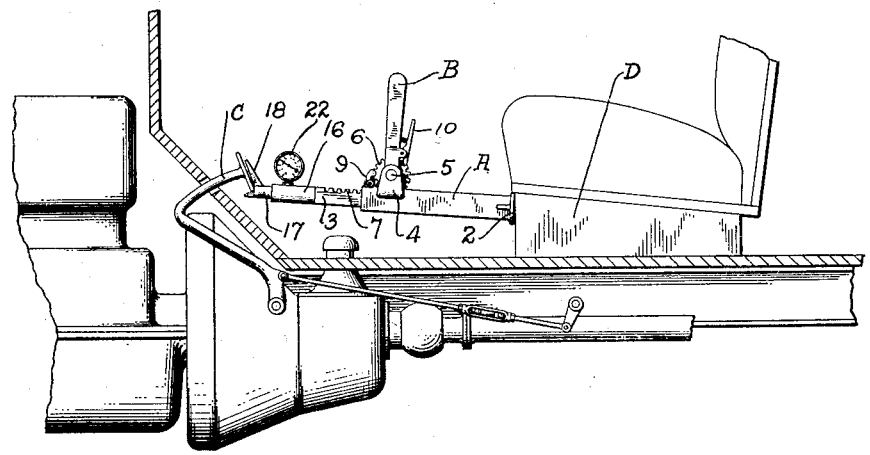
Figure 1 is a partial side elevation in section of an automobile, showing the method of inserting the jack between the foot brake pedal and the front seat of an automobile.

In actual operation if the brakes of an automobile are to be adjusted and tested, it is necessary that the brake pedal be depressed and it is at the same time desirable to determine the amount of pressure applied as the pressure or gripping action exerted by the brakes on the drums is in every instance proportional to the amount of pressure exerted on the brake pedal. The jack shaft shown in the present instance does not only serve the function of depressing the pedal and retaining it depressed while the adjustment and testing operation is taking place, but it also indicates the amount of pressure applied. This is essential as some cars are driven by men and others by women, for instance the average man might exert a pressure on the foot pedal of seventy-five pounds or more when applying the brakes, while a small woman might not exert a greater pressure than forty pounds or so. The brakes should in each instance be adjusted accordingly. The jack is placed in position, as shown in Figure 1, the rack bar and the foot extension 18 engaging the foot pedal, while the foot extension 2 engages the front seat D of the automobile. By working the lever B back and forth, the brake bar and foot extension are quickly extended and the pedal depressed, and as it is being depressed, the pressure applied is registered and indicated on the gauge. When the desired pressure is reached, the extending operation is stopped and the brakes may then be adjusted and tested. When the brakes have been adjusted and tested, the jack is removed by merely depressing the lever B so that it will assume the position shown in Figure 2. Such depression causes the cams 8 to engage the pawl 9, thereby releasing it with relation to the teeth of the gear 6. The lever on the pawl 10 at the same time engages the lug 12 and this will also become released. Gear 6 is thus left entirely free and the pressure of the foot pedal will immediately cause the rack bar to telescope within the jack housing A. The jack is thus quickly and almost instantly released and as such may be readily removed, the entire operation of placing it in position, adjusting it, and then removing it being easily accomplished by any one whether skilled or otherwise.

While certain features of the present invention are more or less specifically described, I wish it understood that various changes may be resorted to within the scope of the appended claims; similarly, that the materials and finishes of the several parts employed may be such as the manufacturer may decide or varying conditions or uses may demand.

Having thus described my invention, what I claim and desire to secure by Letters Patent is:

1. A device of the character described comprising an elongated housing, a toothed rack bar slidably mounted therein, means for extending the rack bar, a plunger mounted in one end of the rack bar, a spring interposed between one end of the plunger and the rack bar to yieldingly support the plunger, said plunger having an elongated slot formed therein, and a pin extending through the rack bar and the slot and limiting the movement of the plunger with relation to the rack bar.

2. A device of the character described, comprising an elongated housing, a bar slidably mounted in the housing, means for extending the bar, a plunger reciprocally mounted in one end of the bar, resilient means urging the plunger to an extended position, said plunger having an elongated slot formed therein, and means carried by the said bar and engageable with either end of said slot to limit reciprocal movement of the plunger.

WILLIS H. WATROUS.